(12) United States Patent
Hisano

(10) Patent No.: US 11,177,747 B2
(45) Date of Patent: Nov. 16, 2021

(54) POWER CONVERSION DEVICE AND POWER CONVERSION METHOD

(71) Applicant: Mitsubishi Electric Corporation, Tokyo (JP)

(72) Inventor: Yuya Hisano, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 214 days.

(21) Appl. No.: 16/496,468

(22) PCT Filed: Apr. 19, 2017

(86) PCT No.: PCT/JP2017/015761
§ 371 (c)(1),
(2) Date: Sep. 23, 2019

(87) PCT Pub. No.: WO2018/193560
PCT Pub. Date: Oct. 25, 2018

(65) Prior Publication Data
US 2021/0281200 A1 Sep. 9, 2021

(51) Int. Cl.
| H02P 9/30 | (2006.01) |
| F02N 11/04 | (2006.01) |
| H02P 9/48 | (2006.01) |
| H02P 27/08 | (2006.01) |

(52) U.S. Cl.
CPC .............. *H02P 9/305* (2013.01); *F02N 11/04* (2013.01); *H02P 9/48* (2013.01); *H02P 27/08* (2013.01)

(58) Field of Classification Search
CPC .. H02P 9/305; H02P 9/48; H02P 27/08; F02N 11/04
See application file for complete search history.

(56) References Cited

U.S. PATENT DOCUMENTS

2015/0097509 A1* 4/2015 Hisano ................. H02P 6/10
318/719

FOREIGN PATENT DOCUMENTS

| JP | 2004-015847 A | 1/2004 |
| JP | 2016-185026 A | 10/2016 |

* cited by examiner

*Primary Examiner* — Viet P Nguyen
(74) *Attorney, Agent, or Firm* — Sughrue Mion, PLLC; Richard C. Turner

(57) ABSTRACT

A power conversion device, comprising: an energization device (END) applying a voltage to armature and field windings of a rotating electrical machine (REM) according to an energization signal (ENS), and having inverter and alternator power generation modes (I-PGM, A-PGM); a power-generation switching signal generator (PGSSG) generating a power-generation switching signal (GES) for switching the I-PGM, A-PGM according to switching of a first selection (FSS) switching the modes arbitrarily and a second selection (SSS) switching the modes base on a maximum output in the modes; a voltage command generator (VCG) generating an armature voltage command (AVC) and a field voltage command (FVC) based on a REM output command (REMC); an energization signal generator (ESG) generating the ENS corresponding to armature and field windings based on AVC, FVC, GES and DC voltage of END, wherein PGSSG generates the GES by switching FSS, SSS regarding a rotating electrical machine output command MOC value.

20 Claims, 9 Drawing Sheets

POWER CONVERSION DEVICE AND POWER CONVERSION METHOD

CROSS REFERENCE TO RELATED APPLICATIONS

This application is a National Stage of International Application No. PCT/JP2017/015761, filed Apr. 19, 2017.

TECHNICAL FIELD

The present invention relates to a power conversion device and a power conversion method, which are directed to controlling a wound magnetic field rotating electrical machine.

BACKGROUND ART

In recent years, regulations on fuel consumption of automobiles have been reinforced. In response to this reinforcement, the number of electric vehicles, in which functional parts are partially or entirely powered, has been increased. The electric vehicle uses, as a driving force of the vehicle, part or all of motoring torque generated by a rotating electrical machine, and also carry out a power generation operation in which a braking torque generated during deceleration is converted into electric energy.

The wound magnetic field rotating electrical machine including an armature winding and a field winding can carry out a power generation operation in two power generation modes, that is, an inverter power generation mode and an alternator power generation mode.

In the inverter power generation mode, a power conversion device is configured to energize both the armature winding and the field winding so as to cause a current to flow through each of the windings, to thereby perform a power generation operation.

In the alternator power generation mode, a power generation operation can be performed as follows. That is, the field winding is energized during rotation of the rotating electrical machine so that a current flows therethrough, to thereby generate a induced voltage in the armature winding. At this time, when an amplitude of the induced voltage, specifically, line voltage amplitude exceeds a value of a DC voltage in the power conversion device, a current flows through the armature winding.

In the alternator power generation mode, power cannot be generated unless a rotational speed is at a predetermined level or more. Thus, when power is required to be generated by a low-rotational-speed operation in which power generation in the alternator power generation mode cannot be obtained, a power generation operation is performed in the inverter power generation mode.

Further, even when a rotational speed suffices for power generation both in the inverter power generation mode and the alternator power generation mode, in the case in which a maximum value of a power-generation torque (corresponding to an electric load) generated in the inverter power generation mode exceeds that of a power-generation torque generated in the alternator power generation mode, it is possible to output a power-generation torque up to the maximum value of the power-generation torque that can be generated in the alternator power generation mode, and then output the remaining power-generation torque in the inverter power generation mode. It is also possible to compare the power generation modes in terms of efficiency to select the more efficient one.

In each of Patent Literature 1 and Patent Literature 2 described below, there is described a technique of switching an inverter power generation mode and an alternator power generation mode depending on various conditions as described above.

In Patent Literature 1, a hysteresis width is set between a rotational speed at which the inverter power generation mode is switched to the alternator power generation mode and a rotational speed (switching rotational speed) at which the alternator power generation mode is switched to the inverter power generation mode so as to reduce a frequency of switching power generation modes and achieve a stable operation. In addition, the switching rotational speeds are changed depending on an electric load. With this configuration, the above-mentioned switching operation can be performed in which a power generation operation is performed in the inverter power generation mode during a low-rotational-speed operation in which power generation cannot be obtained in the alternator power generation mode.

In Patent Literature 2, the power generation modes are switched so that the more efficient power generation mode between the inverter power generation mode and the alternator power generation mode is selected. This enables an optimum operation in terms of efficiency. Moreover, a hysteresis width is set at the time of selecting a power generation mode depending on efficiency so that a frequency of switching power generation modes is reduced and a stable operation is ensured.

CITATION LIST

Patent Literature

[PTL 1] JP 2004-015847 A
[PTL 2] JP 2016-185026 A

SUMMARY OF INVENTION

Technical Problem

In Patent Literature 1, however, the two power generation modes are switched based only on a rotational speed and an electrical load. This switching operation is not necessarily optimum in terms of efficiency.

In Patent Literature 2, the switching operation is optimum in terms of efficiency. However, no hysteresis width is set at the time of switching a selection scheme by which a power generation mode is selected depending on efficiency and a selection scheme by which a power generation mode is selected based on a maximum value of a power-generation torque generated in each power generation mode, and hence two selection schemes are frequently switched, and consequently, there is a risk in that the inverter power generation mode and the alternator power generation mode are frequently switched.

In general, the inverter power generation mode and the alternator power generation mode are different in level or phase of voltage applied to an armature winding and in amount or phase of a current flowing through the armature winding. Thus, in the case where the power generation modes are frequently switched, there is a fear in that a current fluctuates during the switching and consequently, a power-generation torque and a generated power fluctuate and a stable power-generation operation cannot be performed.

It is therefore an object of the present invention to provide a power conversion device and a power conversion method, by which the above-mentioned problem can be solved and which ensure all of high stability, high efficiency, and high output.

Solution to Problem

According to one embodiment of the present invention, there is provided a power conversion device including: an energization device configured to apply a voltage to an armature winding and a field winding of a rotating electrical machine in accordance with an energization signal, the energization device including, as an operation in a power generation mode: an inverter power generation mode configured to cause the rotating electrical machine to perform a power-generation operation by applying a voltage to the armature winding; and an alternator power generation mode configured to cause the rotating electrical machine to perform a power-generation operation by generating an induced voltage in the armature winding in such a manner that a voltage is applied to the field winding during rotation of the rotating electrical machine so as to cause a current to flow through the armature winding; a power-generation switching signal generating unit configured to generate a power-generation switching signal for switching the inverter power generation mode and the alternator power generation mode in response to switching of a first selection scheme and a second selection scheme, the first selection scheme being used to select any one of the inverter power generation mode and the alternator power generation mode, and the second selection scheme being used to calculate each of a maximum output obtained in the inverter power generation mode and a maximum output obtained in the alternator power generation mode and select, when a difference between the maximum outputs is equal to or larger than a preset value, one of the inverter power generation mode and the alternator power generation mode, which produces a larger maximum output; a voltage command generating unit configured to generate an armature voltage command that indicates a voltage to be applied to the armature winding and a field voltage command that indicates a voltage to be applied to the field winding, based on a rotating electrical machine output command that indicates an output of the rotating electrical machine; and an energization signal generating unit configured to generate the energization signal corresponding to each of the armature winding and the field winding, based on the armature voltage command, the field voltage command, the power-generation switching signal, and a DC voltage value of the energization device, wherein the power-generation switching signal generating unit is configured to, when the rotating electrical machine output command is equal to or smaller than a first switching threshold, select the first selection scheme and generate the power-generation switching signal and when the rotating electrical machine output command is equal to or larger than a second switching threshold that is larger than the first switching threshold, select the second selection scheme and generate the power-generation switching signal.

Advantageous Effects of Invention

According to the present invention, there can be provided the power conversion device and the power conversion method which ensure all of high stability, high efficiency, and high output.

DESCRIPTION OF EMBODIMENTS

According to a power conversion device of the present invention, it is possible to reduce a frequency of switching power generation modes even in a case in which a selection scheme for selecting a power generation mode is changed so that a more efficient power generation mode is selected for an operation region in which power generation is allowed both in an inverter power generation mode and an alternator power generation mode, whereas another power generation mode is selected for an operation region in which a maximum output obtained in one of the power generation modes exceeds that of the other. Therefore, a power-generation operation that ensures all of high stability, high efficiency, and high output can be performed.

Now, a power conversion device and a power conversion method according to each of embodiments of the present invention are described with reference to the drawings. Note that, in each of the embodiments, the same or corresponding portions are denoted by the same reference symbols, and the overlapping description thereof is omitted.

First Embodiment

Figure 1:
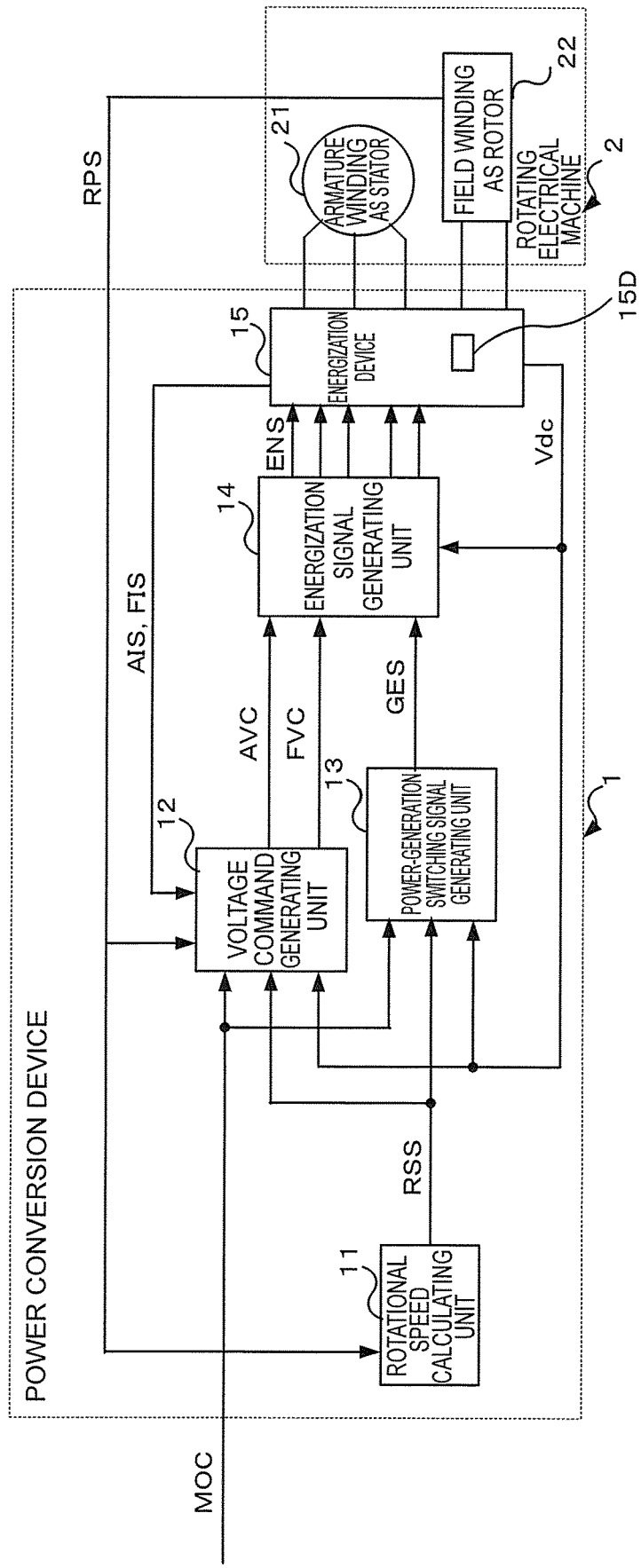
FIG. 1 is a diagram for illustrating a schematic configuration of one example of a power conversion device according to one embodiment of the present invention, together with a rotating electrical machine including an armature winding and a field winding.

FIG. 1 is a diagram for illustrating a schematic configuration of one example of a power conversion device according to one embodiment of the present invention, together with a rotating electrical machine.

In FIG. 1, a power conversion device 1 controls a rotating electrical machine 2 based on a rotating electrical machine output command MOC. The rotating electrical machine 2 is a three-phase synchronous generator motor an electric field of which is a wound magnetic field. The rotating electrical machine 2 includes an armature winding 21 as a stator and a field winding 22 as a rotor. Note that, three phases of the armature winding 21 are star-connected. Further, the power conversion device 1 includes a rotational speed calculating unit 11, a voltage command generating unit 12, a power-generation switching signal generating unit 13, an energization signal generating unit 14, and an energization device 15. The energization device 15 includes an energization element.

The rotational speed calculating unit 11 calculates a rotational speed of the rotating electrical machine 2 and outputs the calculated value as a rotational speed signal RSS. The rotational speed can be calculated, for example, such that a rotational angle sensor for detecting a rotational position or the like is attached to, for example, the rotating electrical machine 2 although not shown and the rotational speed is determined based on a rotor position signal RPS received from the rotational angle sensor.

Note that, the energization device 15 described below is also provided with a detecting unit 15D including detectors for detecting various factors.

The voltage command generating unit 12 generates an armature voltage command AVC that indicates a voltage to be applied to the armature winding 21 and a field voltage command FVC that indicates a voltage to be applied to the field winding 22, and then outputs the generated one. The armature voltage command AVC is used only in the inverter power generation mode. A detailed description of the voltage command generating unit 12 is given later.

The power-generation switching signal generating unit 13 generates a power-generation switching signal GES for switching the inverter power generation mode and the alternator power generation mode, and then outputs the generated one. A detailed description of the power-generation switching signal generating unit 13 is given later.

<Energization Device 15>

Figure 2:
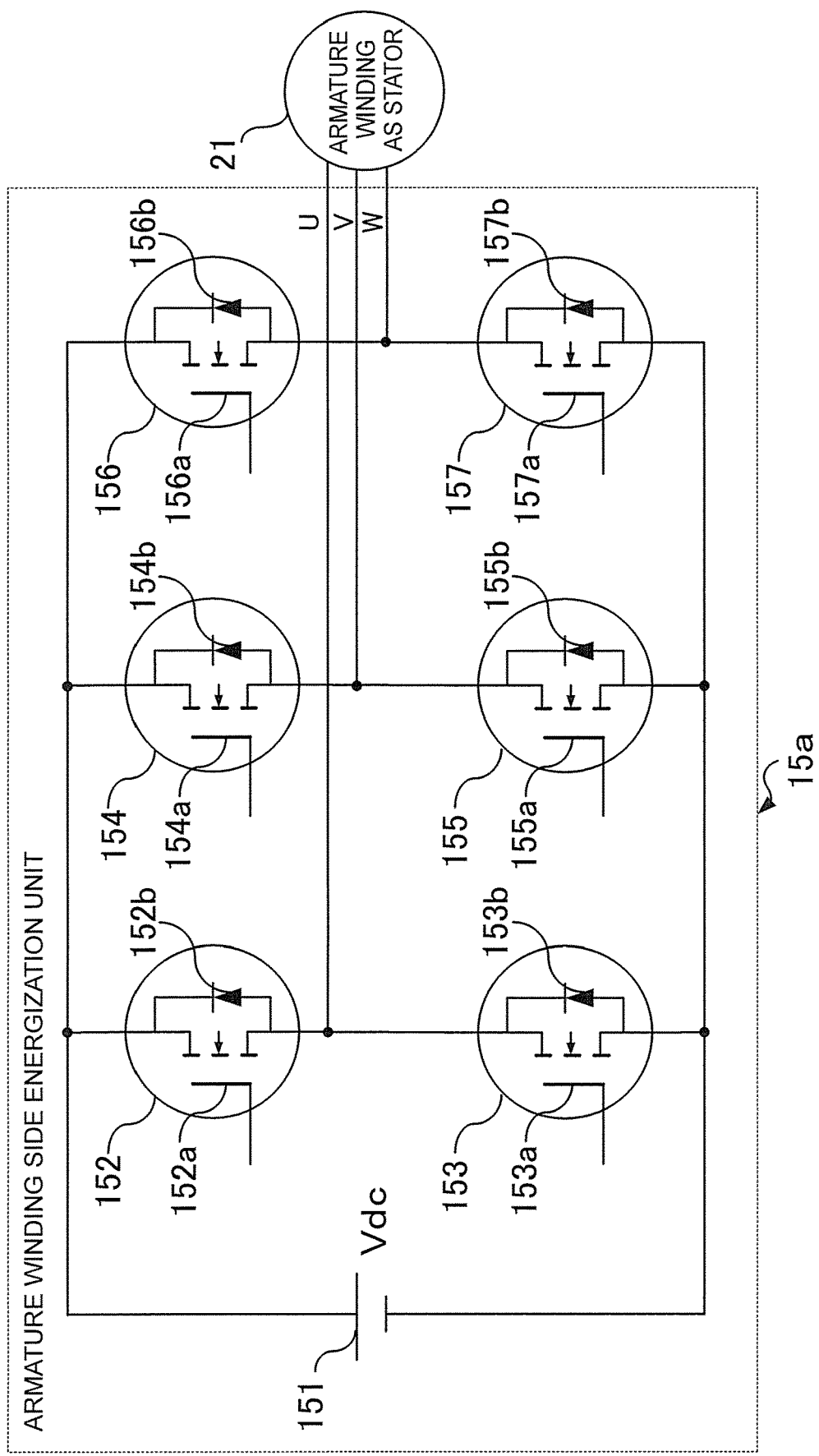
FIG. 2 is a diagram for illustrating a schematic configuration of one example of an armature winding side energization unit in an energization device of FIG. 1.
Figure 3:
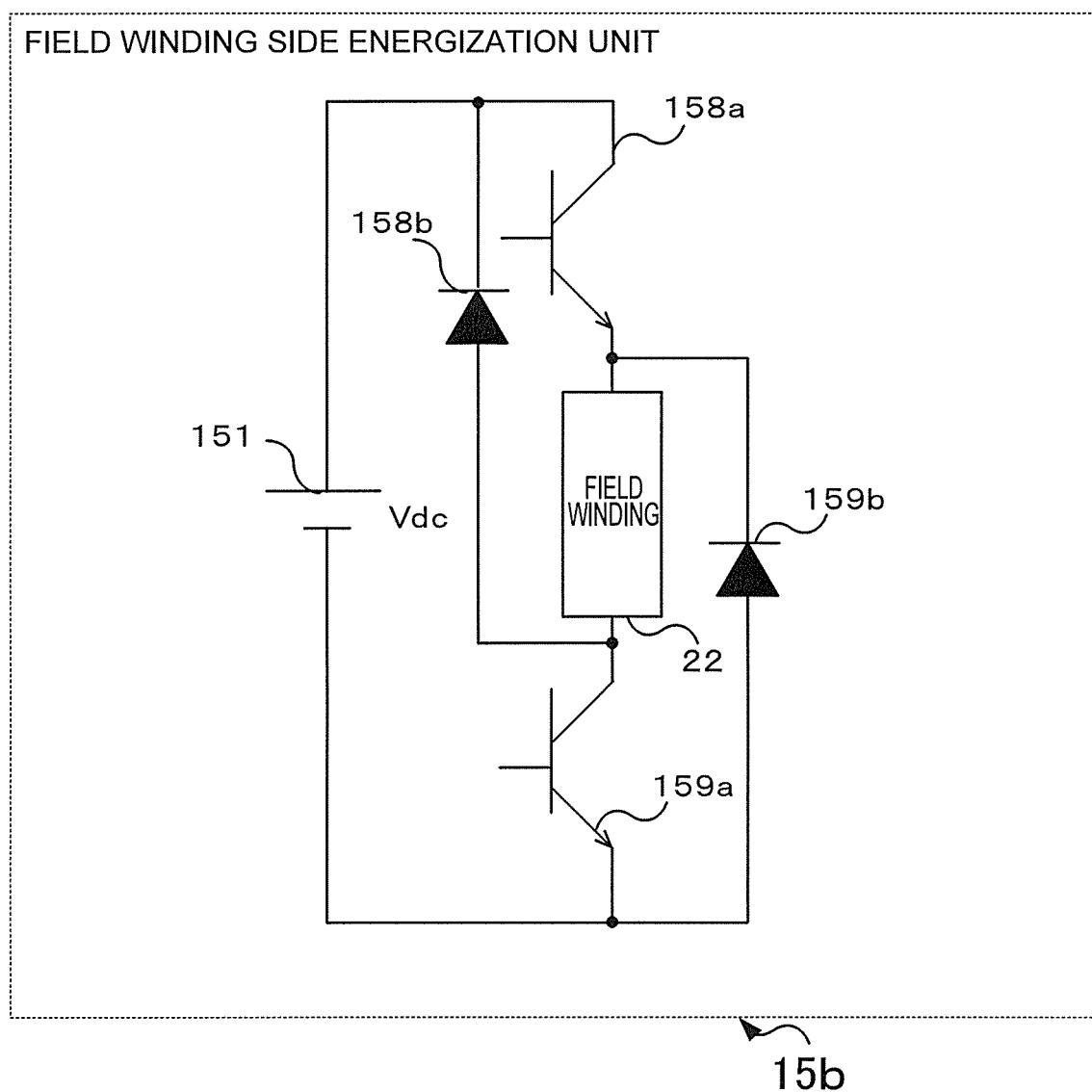
FIG. 3 is a diagram for illustrating a schematic configuration of one example of a field winding side energization unit in the energization device of FIG. 1.

The energization device 15 applies voltage to the armature winding 21 and the field winding 22 for energization or applies no voltage so as to stop the energization, based on an energization signal ENS. In FIG. 2 and FIG. 3, an internal configuration of the energization device 15 is illustrated.

FIG. 2 is a diagram for illustrating one example of an armature winding side energization unit 15a for the armature winding 21, out of the configuration of the energization device 15, together with the armature winding 21. In FIG. 2, the armature winding side energization unit 15a includes a bridge circuit including upper arms and lower arms which are series-connected together in each of U, V, and W phases. The upper arms are denoted by reference symbols 152, 154, and 156 of FIG. 2 and referred to as a U-phase upper arm 152, a V-phase upper arm 154, and a W-phase upper arm 156, respectively. The lower arms are denoted by reference symbols 153, 155, and 157 of FIG. 2 and referred to as a U-phase lower arm 153, a V-phase lower arm 155, and a W-phase lower arm 157, respectively. In each arm, an energization element and a free-wheeling diode are connected antiparallel to each other.

Specifically, in the U-phase upper arm 152, a U-phase upper arm energization element 152a and a U-phase upper arm free-wheeling diode 152b are connected antiparallel to each other.

In the U-phase lower arm 153, a U-phase lower arm energization element 153a and a U-phase lower arm free-wheeling diode 153b are connected antiparallel to each other.

In the V-phase upper arm 154, a V-phase upper arm energization element 154a and a V-phase upper arm free-wheeling diode 154b are connected antiparallel to each other.

In the V-phase lower arm 155, a V-phase lower arm energization element 155a and a V-phase lower arm free-wheeling diode 155b are connected antiparallel to each other.

In the W-phase upper arm 156, a W-phase upper arm energization element 156a and a W-phase upper arm free-wheeling diode 156b are connected antiparallel to each other.

In the W-phase lower arm 157, a W-phase lower arm energization element 157a and a W-phase lower arm free-wheeling diode 157b are connected antiparallel to each other.

Note that in the following description, the condition that an energization element of a certain arm is turned on and the condition that the element is turned off are also simply referred to as, for example, "arm is turned on" and "arm is turned off", respectively. Further, a voltage Vdc indicates voltage across a DC power supply 151 (DC voltage).

FIG. 3 is a diagram for illustrating one example of a field winding side energization unit 15b for the field winding 22, out of the configuration of the energization device 15, together with the field winding 22. In FIG. 3, the field winding side energization unit 15b includes energization elements 158a and 159a and diodes 158b and 159b. Note that, the DC power supply 151 of FIG. 2 is used in this example as well and denoted by the same reference symbol, but any other DC power supply can be used because the armature winding 21 and the field winding 22 are independently energized.

In FIG. 3, a series circuit configured by the field winding 22 and the energization element 158a is antiparallel-connected to the diode 158b, and a series circuit configured by the field winding 22 and the energization element 159a is antiparallel-connected to the diode 159b.

When the energization elements 158a and 159a are both turned on, the voltage Vdc is applied to the field winding 22. When only one of the energization elements 158a and 159a is turned on, a voltage 0 is applied to the field winding 22. The energization signal ENS causes one of the energization elements 158a and 159a to be switched (repeatedly turned on and off) and causes another to be kept on based on a Duty command described later. With this configuration, it is possible to control an average value of voltage applied to the field winding 22 based on the Duty command.

<Energization Signal Generating Unit 14>

The energization signal generating unit 14 generates the energization signal ENS to be supplied to each energization element of the energization device 15, and then outputs the generated one. A pattern for generating the energization signal ENS for the field winding 22 is the same between the inverter power generation mode and the alternator power generation mode. However, a pattern for generating the energization signal ENS for the armature winding 21 is not the same between the inverter power generation mode and the alternator power generation mode. Thus, the pattern for generating the energization signal ENS is changed based on the power-generation switching signal GES for switching between the inverter power generation mode and the alternator power generation mode.

<Inverter Power Generation Mode>

A description is first given of a process for generating the energization signal ENS for the field winding 22 and the energization signal ENS for the armature winding 21 in the inverter power generation mode. First, a Duty command for the armature winding 21 and a Duty command for the field winding 22 are generated based on the armature voltage command AVC, the field voltage command FVC, and a DC voltage value signal Vdc that indicates a DC voltage value Vdc of the energization device 15.

The energization device 15 includes the detecting unit 15D including, for example, detectors for detecting, for example, the DC voltage value Vdc of the DC power supply 151, and an armature current of the armature winding 21 and a field current of the field winding 22, which are generated during energization control. The energization device 15 outputs, for example, the DC voltage value signal Vdc, an armature current signal AIS, and a field current signal FIS.

The Duty command for the field winding 22 is obtained by dividing the field voltage command FVC by the DC voltage value Vdc and regulating the resulting value to a range of 0 to 1.

The Duty command for the armature winding 21 is a value of a three-phase AC system, which is generated from the armature voltage command AVC that varies around zero to positive and negative values. Thus, the armature voltage command AVC is divided by the DC voltage value Vdc and then added with 0.5 so as to regulate the resulting value to a range of 0 to 1.

Note that, in the following description, a value of the Duty command is also represented in percent. Next, the energization signal ENS as a pulse width modulation (PWM) signal is generated from the respective Duty commands.

A process for generating the energization signal ENS from the Duty command is described. The energization signal is generated through comparison between the Duty command and a carrier wave and then is output. The carrier wave is a triangular wave whose value varies in a range from 0 to 1, and the energization signal ENS is a PWM signal.

Figure 4:
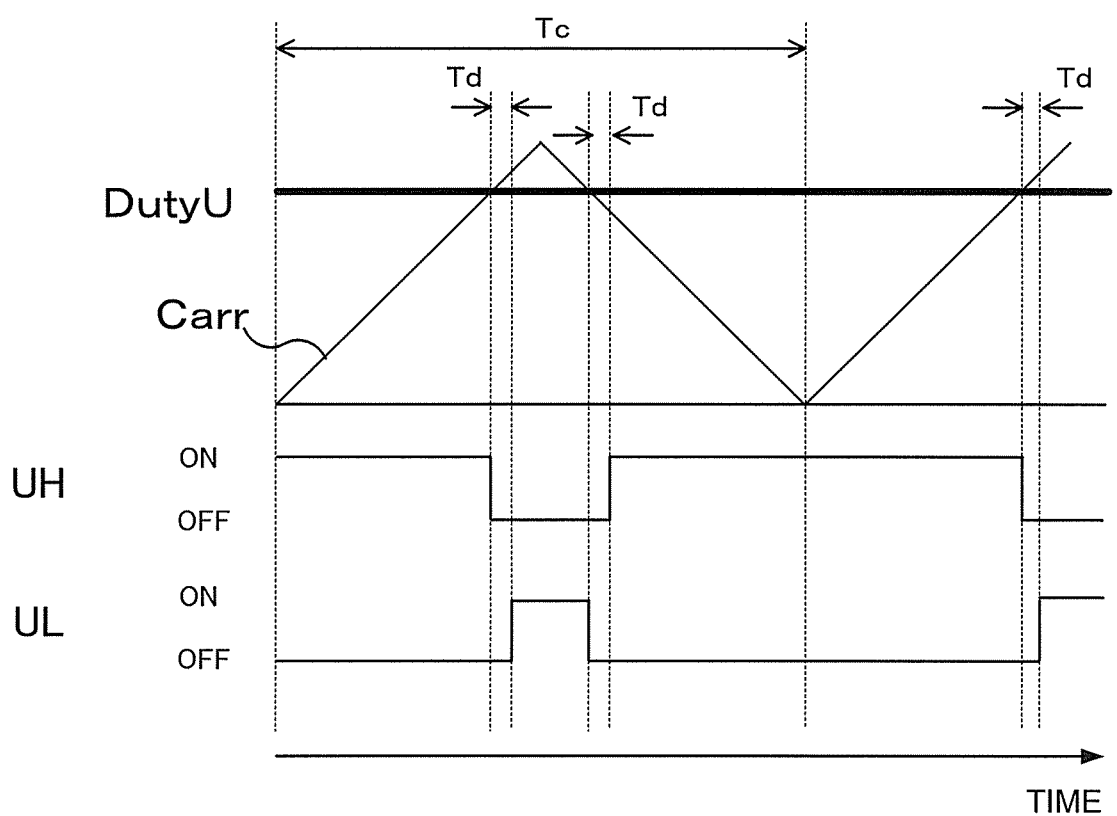
FIG. 4 is an explanatory diagram for illustrating a PWM operation according to one embodiment of the present invention.

FIG. 4 is a diagram for illustrating a corresponding PWM operation. In FIG. 4, reference symbol Carr indicates a carrier wave, DutyU indicates a Duty command of a U-phase, and UH and UL indicate an energization signal of a U-phase upper arm and an energization signal of a U-phase lower arm, respectively. At a time of switching on/off the energization signals UH and UL, a dead time is set, during which both the signals are turned off. This aims to prevent short-circuiting between the upper and lower arms. In FIG. 4, a carrier wave cycle and the dead time are indicated by reference symbols Tc and Td, respectively.

In FIG. 4, only the U phase of the armature winding 21 is illustrated as a typical example. However, other phases of the armature winding 21 and the field winding 22 are the same as the U phase in that the energization signal ENS is generated through comparison between the Duty command and the carrier wave. However, as described above, only one energization element is required to be subjected to switching in order to energize the field winding 22, and hence it is only required to generate an energization signal ENS for the one energization element. Further, no dead time is required at the time of connecting an energization element to energize the field winding 22, because of the configuration in which the DC power supply 151 is not short-circuited at the time of switching on/off the energization element. Moreover, the carrier wave cycle Tc may be different between the energization signal ENS for the armature winding 21 and the energization signal ENS for the field winding 22.

<Alternator Power Generation Mode>

Next, a description is given of a process for generating the energization signal ENS for the armature winding 21 in the alternator power generation mode. The power generation operation in the alternator power generation mode can be carried out as follows. That is, the armature winding 21 is not energized, and a current is caused to flow through the field winding 22 while the rotating electrical machine 2 is rotating, to thereby generate a induced voltage of the three-phase AC system in the armature winding 21. At this time, when an amplitude of the induced voltage, specifically, line voltage amplitude exceeds the DC voltage value Vdc, a power-generation a current flows from the armature winding 21 side to the DC power supply 151 side through the free-wheeling diodes 152b to 157b of FIG. 2.

<Diode Rectification Mode and Synchronous Rectification Mode>

Note that, the alternator power generation mode includes two modes: a diode rectification mode in which a three-phase full-wave rectification operation is performed through use of the free-wheeling diode of FIG. 2 and a synchronous rectification mode in which a current used in the three-phase full-wave rectification operation is partially commutated to an energization element so as to similarly perform power generation. The power generation operation in the synchronous rectification mode is referred to as "synchronous-rectification power generation control".

In general, the energization elements 152a to 157a such as MOSFETs cause a conduction loss smaller than that in the diodes, for example, the free-wheeling diodes 152b to 157b. Thus, a highly efficient power generation operation is allowed in the synchronous rectification mode in which a current is partially commutated to the energization element, compared with the diode rectification mode. Accordingly, an energization signal pattern is generated such that the energization signal ENS for the armature winding 21 causes all arms of all phases to be turned off during the operation in the diode rectification mode and causes an energization element corresponding to a diode through which a current flows, during the operation in the synchronous rectification mode.

<Voltage Command Generating Unit 12>

Figure 5:
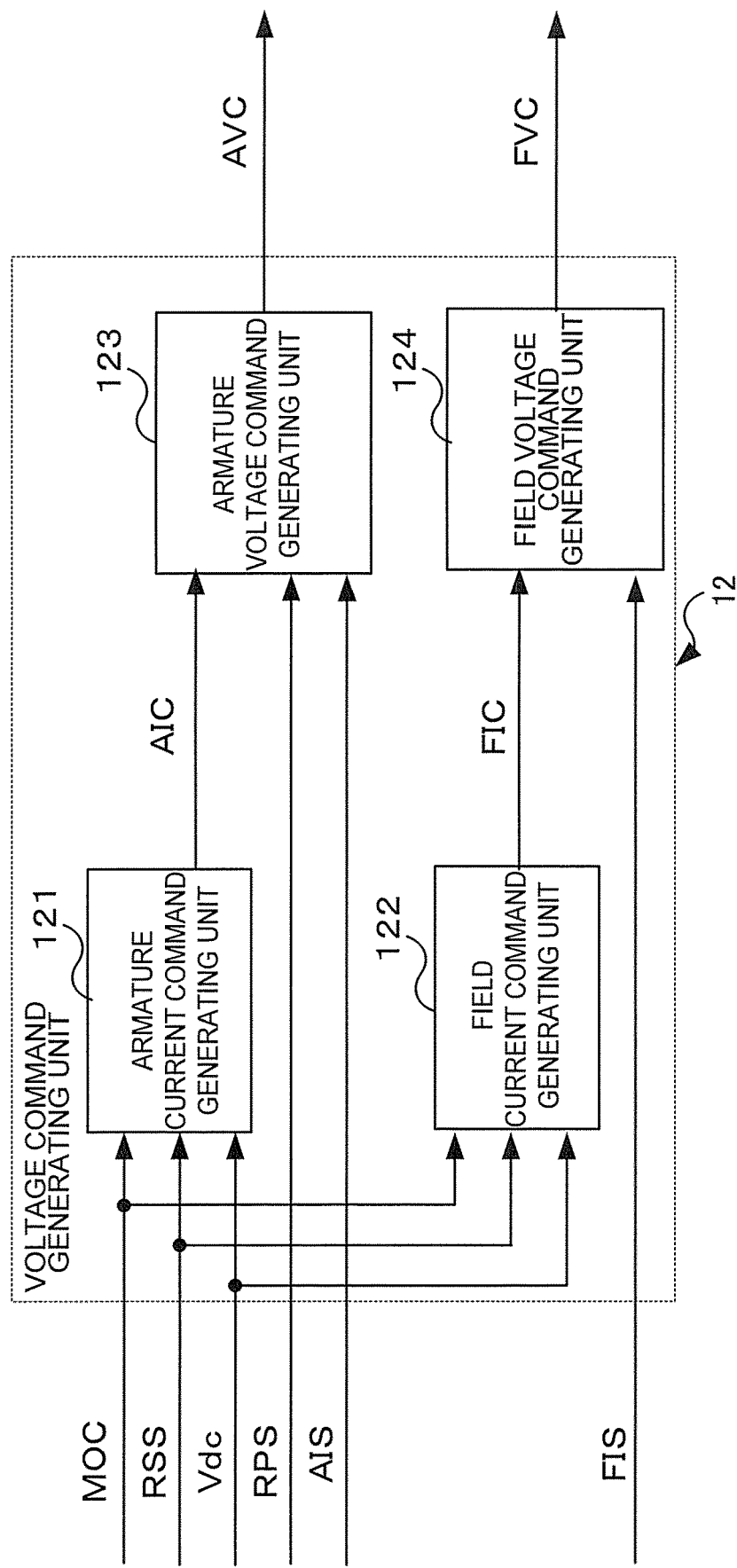
FIG. 5 is a diagram for illustrating one example of an internal configuration of a voltage command generating unit 12 of FIG. 1.

Referring to FIG. 5, a detailed description is given of functions of the voltage command generating unit 12. The voltage command generating unit 12 includes an armature current command generating unit 121, a field current command generating unit 122, an armature voltage command generating unit 123, and a field voltage command generating unit 124. Note that, the current signals input to the voltage command generating unit 12 of FIG. 1 are the armature current signal AIS indicative of an armature current in the armature winding 21 and the field current signal FIS indicative of a field current in the field winding 22. Those two current signals are used for generating the armature voltage command AVC and the field voltage command FVC, respectively and therefore illustrated separately in FIG. 5.

The armature current command generating unit 121 generates the armature current command AIC that indicates current to be supplied to the armature winding 21, based on the externally-received rotating electrical machine output command MOC, a rotational speed signal RSS indicative of a rotational speed of the rotating electrical machine 2, which is received from the rotational speed calculating unit 11, and the DC voltage value signal Vdc indicative of a DC voltage from the DC power supply 151 of the energization device 15, which is received from the energization device 15. Then, the armature current command generating unit 121 outputs the generated one. In this example, the armature current command AIC is assumed to be a value on a dq-axis where a d-axis extends to a magnetic pole position of the rotor (22) and a q-axis extends orthogonal to the d-axis. The armature current command AIC can be calculated though use of, for example, a map based on which the rotating electrical machine output command MOC, the rotational speed signal RSS of the rotating electrical machine 2, and the DC voltage value signal Vdc of the energization device 15 are used as arguments to derive the armature current command AIC on the dq-axis.

Note that, the armature voltage command AVC is used only in the inverter power generation mode as described above, and hence the armature current command AIC used for generating the armature voltage command AVC is also used only in the inverter power generation mode.

The field current command generating unit 122 generates the field current command FIC that indicates a current to be supplied to the field winding 22, based on the rotating electrical machine output command MOC, the rotational speed signal RSS of the rotating electrical machine 2, and the DC voltage value signal Vdc of the energization device 15 described above, and then outputs the generated one. The field current command FIC can be generated, for example, through use of, for example, a map based on which the rotating electrical machine output command MOC, the rotational speed signal RSS of the rotating electrical machine 2, and the DC voltage value signal Vdc of the energization device 15 are used as arguments to derive the field current command FIC.

Note that, the field voltage command FVC is required for both the inverter power generation mode and the alternator power generation mode, and hence the field current command FIC is also required for both the inverter power generation mode and the alternator power generation mode. Accordingly, when the command is derived through use of the above-mentioned map, the map is required to be created for both the inverter power generation mode and the alternator power generation mode.

The armature voltage command generating unit 123 generates, as the armature voltage command AVC that indicates voltage to be applied to the armature winding 21, the armature voltage command AVC of the three-phase AC system, which varies around zero to positive and negative values, based on the field current command FIC, the armature current signal AIS indicative of an armature current supplied from the energization device 15, and the rotor position signal RPS indicative of a rotor position of the rotor (22), which is received from the rotating electrical machine 2. Then, the armature voltage command generating unit 123 outputs the generated one. In this case, prior to the generation of the armature voltage command AVC of the three-phase AC system, an armature voltage command avc on the dq-axis is generated.

The armature voltage command avc can be generated through, for example, PI control that is executed based on a difference between an armature current command aic (dq current command) on the dq-axis and a current (dq current) on the dq-axis. Note that, the armature current can be detected through use of a current sensor such as a current-detection shunt resistor, which is attached to the energization device 15, but the armature current detected by the current sensor is a value of the three-phase AC system, not a value on the dq-axis.

Thus, a dq current is generated through use of the rotor position signal RPS indicative of the rotor position and the armature current signal AIS indicating a current generated in the three-phase AC system. In a case of generating the dq current from the current of the three-phase AC system and the rotor position, common three-phase to dq conversion is employed. Subsequently, a voltage command of the three-phase AC system is generated from the rotor position and the dq voltage command, and is output as the armature voltage command AVC. In a case of generating the voltage command of the three-phase AC system from the rotor position and the dq voltage command, common dq to three-phase conversion is employed.

The field voltage command generating unit 124 generates the field voltage command FVC that indicates a voltage to be applied to the field winding 22, based on the field current command FIC received from the field current command generating unit 122, and the field current signal FIS received from the energization device 15, and then outputs the generated one. The field voltage command FVC can be generated through, for example, PI control that is executed based on a difference between the field current command FIC and the field current (FIS). Note that, the field current can be detected by a current sensor such as a current-detection shunt resistor, which is attached to the energization device 15.

<Power-Generation Switching Signal Generating Unit 13>

A detailed description is given of functions of the power-generation switching signal generating unit 13. The power-generation switching signal generating unit 13 generates a power-generation switching signal GES so as to switch a first selection scheme and a second selection scheme as a selection scheme for selecting the inverter power generation mode or the alternator power generation mode, based on a first switching threshold and a second switching threshold. Then, the power-generation switching signal generating unit 13 outputs the generated one.

First Selection Scheme

The first selection scheme is to freely select a power generation mode from the inverter power generation mode and the alternator power generation mode when the power generation is allowed both in the inverter power generation mode and the alternator power generation mode. In this example, the first selection scheme is assumed to select a more efficient power generation mode when the inverter power generation mode and the alternator power generation mode have a difference in efficiency, which is equal to or larger than a preset value.

The efficiency in the inverter power generation mode and the efficiency in the alternator power generation mode are calculated based on the rotating electrical machine output command MOC, the rotational speed signal RSS indicative of the rotational speed of the rotating electrical machine 2, and the DC voltage value signal Vdc of the energization device 15. The efficiency may be not only efficiency of the rotating electrical machine 2 and efficiency of the power conversion device 1 but also a total efficiency that is efficiency of energy conversion from mechanical power of the rotating electrical machine 2 to power to be generated in the power conversion device 1; in this example, the efficiency means the total efficiency. The efficiency can be calculated through use of, for example, a map based on which the rotating electrical machine output command MOC, the rotational speed (RSS) of the rotating electrical machine 2, and the DC voltage value (Vdc) of the energization device 15 are used as arguments to derive efficiency in each of the inverter power generation mode and the alternator power generation mode.

Second Selection Scheme

The second selection scheme is assumed to select a power generation mode having a larger maximum output when a maximum output of the inverter power generation mode and a maximum output of the alternator power generation mode have a difference, which is equal to or larger than a preset value.

The maximum outputs (Mmaxinv, Mmaxalt) in the inverter power generation mode and the alternator power generation mode, respectively, are calculated based on the rotational speed (RSS) and the DC voltage value (Vdc). The maximum outputs can be calculated through use of, for example, a map according to which the rotational speed (RSS) and the DC voltage value (Vdc) are used as arguments to derive the maximum outputs in the inverter power generation mode and the alternator power generation mode.

<Operation of Selecting Power Generation Mode by Power-Generation Switching Signal Generating Unit 13>

Figure 6:
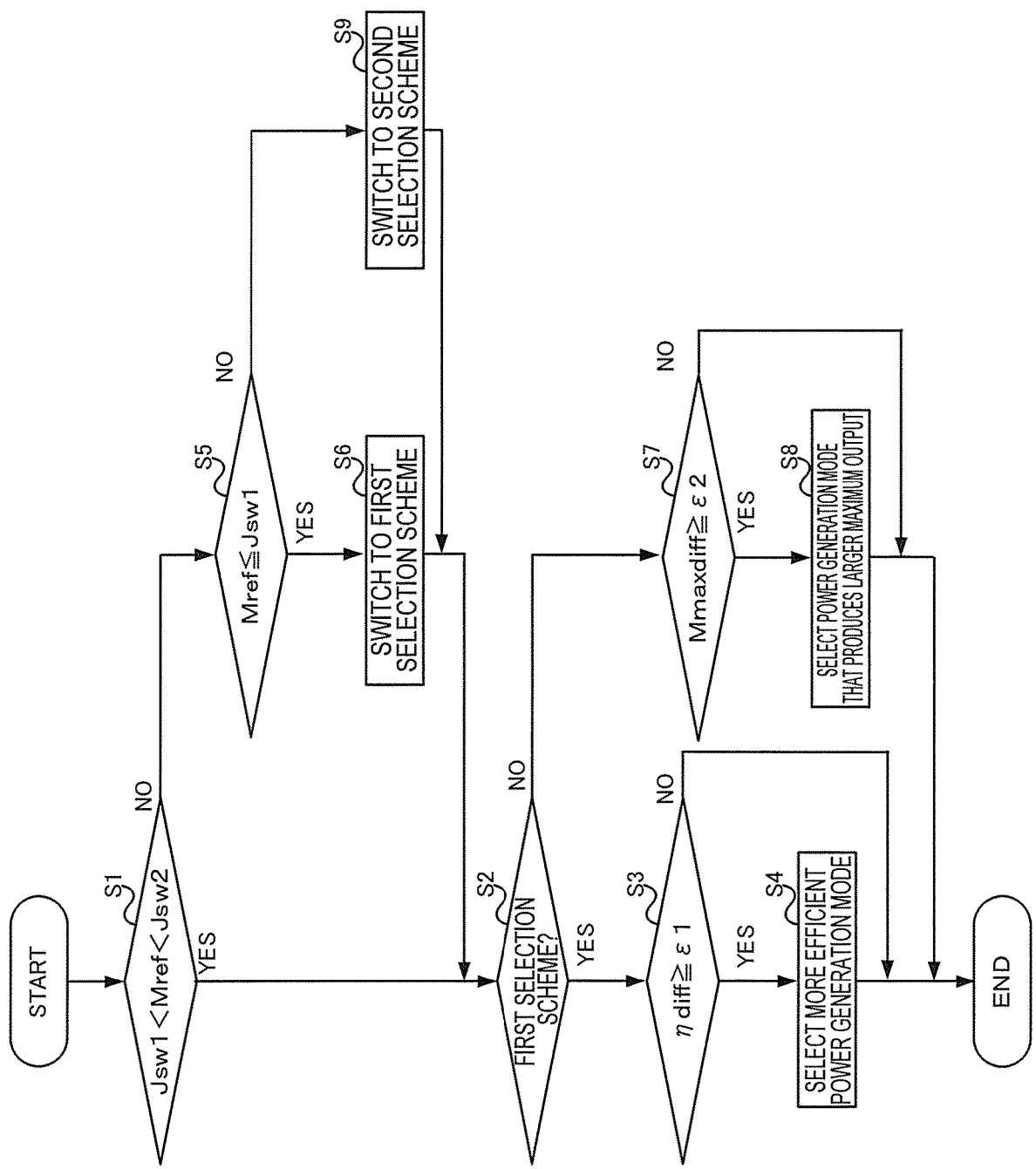
FIG. 6 is an operational flowchart for illustrating one example of an operation of selecting a power generation mode by a power conversion device according to one embodiment of the present invention.

FIG. 6 is an operational flowchart for illustrating one example of an operation of selecting the power generation mode by the power-generation switching signal generating unit 13. Note that, during the power generation operation of the power conversion device 1, the entire process, from START to END, of the flowchart is repeatedly performed. A selection scheme for selecting a power generation mode and a power generation mode in an initial state corresponding to "START" of FIG. 6 are required to be set. In this example, the selection scheme is initially set to the first selection scheme and the power generation mode is initially set to the inverter power generation mode.

In Step S1, it is determined whether or not a rotating electrical machine output command Mref (MOC) is larger than a first switching threshold Jsw1 and also smaller than a second switching threshold Jsw2 (Jsw1<Jsw2). If YES, the processing proceeds to Step S2. If NO, the processing proceeds to Step S5. Step S5 is described later.

In Step S2, it is determined whether or not a current selection scheme is the first selection scheme. If YES, the processing proceeds to Step S3. If NO, the processing proceeds to Step S7. Step S7 is described later.

In previous Step S2, it is determined that the current selection scheme is the first selection scheme (the selection scheme by which a more efficient power generation mode is selected), and hence in Step S3, it is determined whether or not a difference ηdiff in efficiency between the inverter power generation mode and the alternator power generation mode is equal to or larger than a preset value ε1. If YES, the processing proceeds to Step S4. If NO, the processing ends with this step.

In previous Step S3, it is determined that the difference ηdiff in efficiency between the inverter power generation mode and the alternator power generation mode is equal to or larger than the preset value ε1, and hence in Step S4, a more efficient one of the inverter power generation mode and the alternator power generation mode is selected.

In Step S7 that is executed If NO in Step S2, i.e., if the current selection scheme is the second selection scheme (the selection scheme by which a power generation mode that provides a larger maximum output is selected), it is determined whether or not a difference Mmaxdiff in maximum output between the inverter power generation mode and the alternator power generation mode is equal to or larger than a preset value ε2. If YES, the processing proceeds to Step S8. If NO, the processing ends with this step.

In previous Step S7, it is determined that the difference Mmaxdiff in maximum output between the inverter power generation mode and the alternator power generation mode is equal to or larger than the preset value ε2, and hence in Step S8, one of the inverter power generation mode and the alternator power generation mode, which provides a larger maximum output, is selected.

In Step S5 that is executed if NO in Step S1, it is determined whether or not the rotating electrical machine output command Mref is equal to or smaller than the first switching threshold Jsw1. If YES, the processing proceeds to Step S6. If NO, the processing proceeds to Step S9.

In previous Step S5, it is determined that the rotating electrical machine output command Mref is equal to or smaller than the first switching threshold Jsw1, and hence in Step S6, the selection scheme for selecting a power generation mode is switched to the first selection scheme and then, the processing proceeds to Step S2.

Step S9 is executed if NO in both of the determination in Step S1 and that in Step S5, i.e., when the rotating electrical machine output command Mref is equal to or larger than the second switching threshold Jsw2, and hence the selection scheme for selecting a power generation mode is switched to the second selection scheme and the processing proceeds to Step S2.

Next, a description is given of how the selection schemes or the power generation modes are switched in response to change in rotating electrical machine output command Mref, for the following two cases: Case A in which the present invention is not applied and Case B in which the present invention is applied.

In this example, it is assumed that both in Cases A and B, the difference ηdiff in efficiency between the alternator power generation mode and the inverter power generation mode is equal to or larger than the preset value ε1 at an operating point at which the first selection scheme is used, and thus, a more efficient mode is selected. It is also assumed that in this example, the alternator power generation mode provides higher efficiency than the inverter power generation mode, and thus, the alternator power generation mode is selected when the first selection scheme is applied.

It is also assumed that in this example, the inverter power generation mode provides the maximum output Mmaxinv larger than the maximum output Mmaxalt obtained in the alternator power generation mode, and their difference Mmaxdiff in maximum output is equal to or larger than the preset value ε2, and the inverter power generation mode is therefore selected when the second selection scheme is applied. Note that, the rotating electrical machine output command Mref (MOC) is defined as any one of the following:

a power-generation torque command GTC that indicates a power-generation torque GT2 of the rotating electrical machine 2;

a power command GWC that indicates a power GW1 to be generated in the power conversion device 1, which corresponds to the output of the rotating electrical machine 2; and a power-generation current command GIC that indicates a power-generation current GI1 of the power conversion device 1, which corresponds to the output of the rotating electrical machine 2.

In this example, it is assumed that the rotating electrical machine output command Mref is defined as the power-generation torque command GTC, and the maximum output obtained in each of the inverter power generation mode and the alternator power generation mode is defined by the power-generation torque.

(Case a in which the Present Invention is not Applied)

Figures 7A, 7B, 7C:
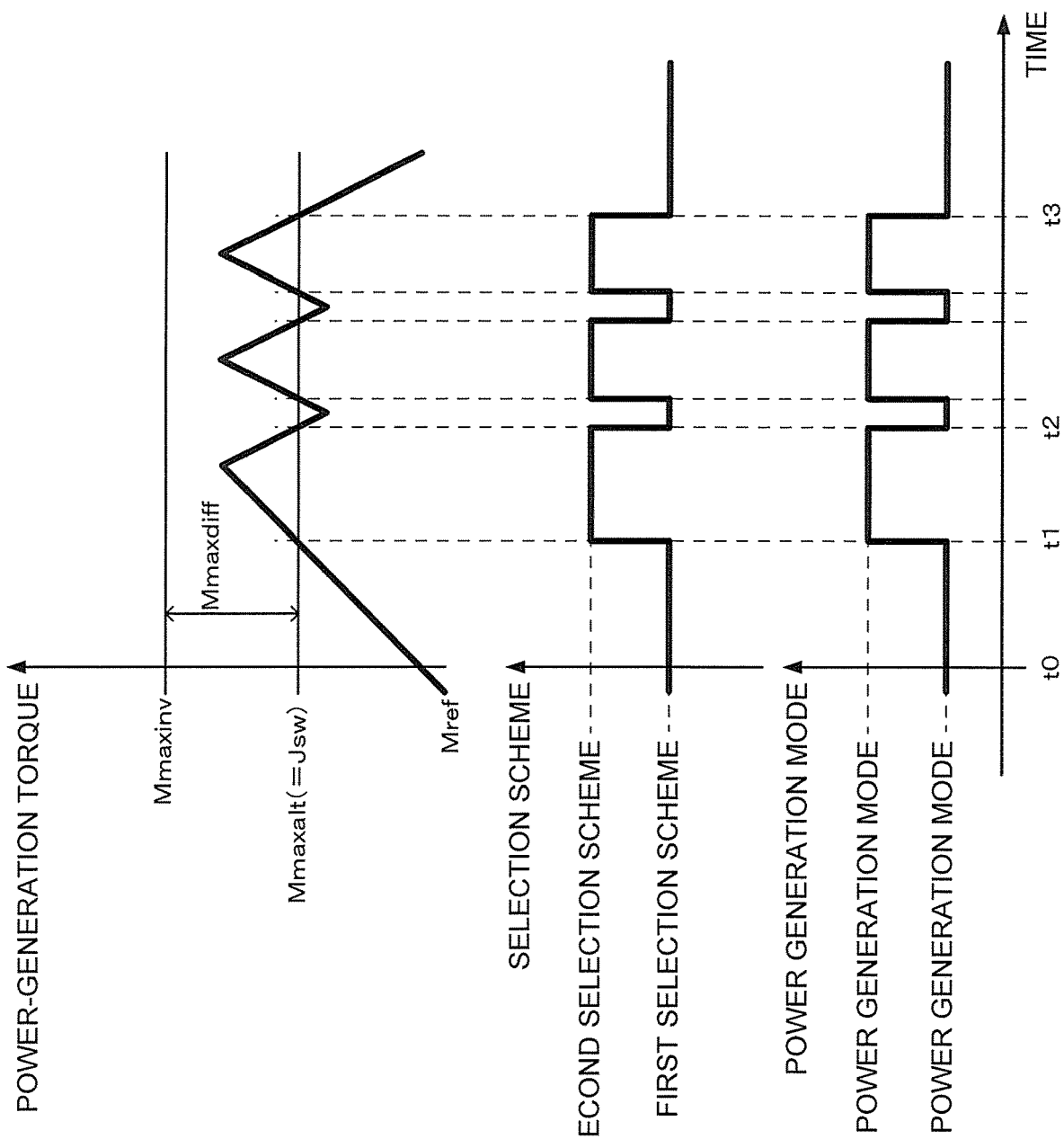
FIGS. 7A to 7C are explanatory diagrams for illustrating an operation of switching power generation modes, in a case where the present invention is not applied.

FIGS. 7A to 7C are illustrations of one example of an operation of switching a power generation mode when the present invention is not applied to switching between the first selection scheme (the selection scheme by which a more efficient power generation mode is selected) and the second selection scheme (the selection scheme by which a power generation mode that provides a larger maximum output is selected). A horizontal axis represents time, a vertical axis of FIG. 7A represents the power-generation torque, a vertical axis of FIG. 7B represents the selection scheme, and a vertical axis of FIG. 7C represents the power generation mode. In FIGS. 7A to 7C, it is assumed that the switching threshold Jsw for switching the first selection scheme and the second selection scheme is defined by the power-generation torque and set equal to the maximum output Mmaxalt obtained in the alternator power generation mode.

A description is given of how the selection schemes or the power generation modes are switched, under the above-mentioned assumptions, in response to the rotating electrical machine output command (in this example, the power-generation torque command) Mref that changes with time.

(During Period from Time t0 to Time t1)

As illustrated in FIG. 7A, during a period during which the rotating electrical machine output command Mref is smaller than Mmaxalt (=Jsw), the first selection scheme is selected as illustrated in FIG. 7B, and the selected power generation mode is the alternator power generation mode as illustrated in FIG. 7C. Until the rotating electrical machine output command Mref reaches Mmaxalt (=Jsw) at time t1, the above-mentioned state continues.

(At Time t1)

As illustrated in FIG. 7A, when the rotating electrical machine output command Mref reaches Mmaxalt (=Jsw), the second selection scheme is selected as illustrated in FIG. 7B, and the power generation mode is switched to the inverter power generation mode as illustrated in FIG. 7C.

(At Time t2)

As illustrated in FIG. 7A, when the rotating electrical machine output command Mref is decreased to be less than Mmaxalt (=Jsw), the first selection scheme is selected as illustrated in FIG. 7B, and the power generation mode is switched back to the alternator power generation mode as illustrated in FIG. 7C.

(During Period from Time t2 to Time t3)

As illustrated in FIG. 7A, the rotating electrical machine output command Mref repeatedly rises above and falls below Mmaxalt (=Jsw) to frequently switch the selection schemes as illustrated in FIG. 7B, and consequently, the power generation modes are frequently switched as illustrated in FIG. 7C.

As described above, when the present invention is not applied and a hysteresis width is not set for switching between the first selection scheme and the second selection scheme, it is accordingly possible that the power generation modes are frequently switched.

(Case B in which the Present Invention is Applied)

Figure 8A:
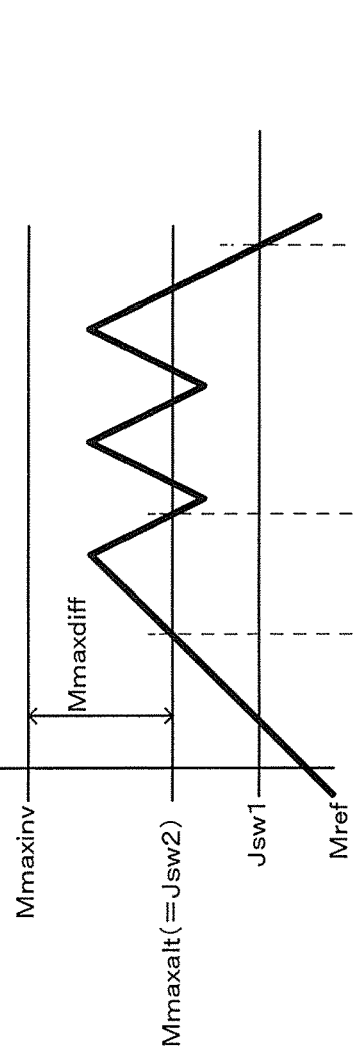
FIGS. 8A to 8C are explanatory diagrams for illustrating one example of an operation of switching power generation modes in a case where one embodiment of the present invention is applied.
Figure 8B:
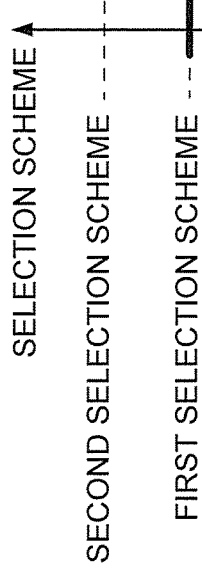
Figure 8C:
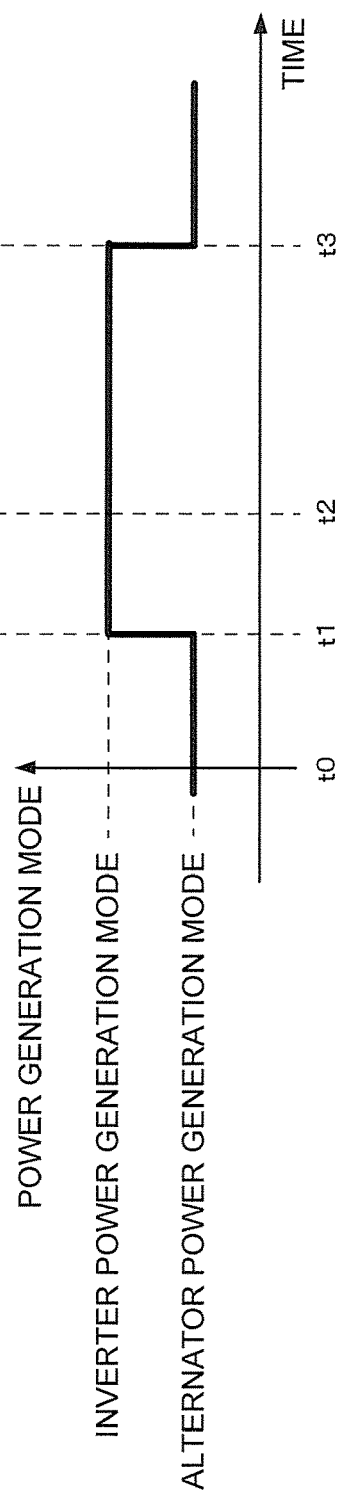

FIGS. 8A to 8C are illustrations of one example of an operation of switching a power generation mode when the present invention is applied to switching between the first selection scheme (the selection scheme by which a more efficient power generation mode is selected) and the second selection scheme (the selection scheme by which a power generation mode that provides a larger maximum output is selected). Similarly to FIGS. 7A to 7C, a horizontal axis represents time, a vertical axis of FIG. 7A represents the power-generation torque, a vertical axis of FIG. 7B represents the selection scheme, and a vertical axis of FIG. 7C represents the power generation mode.

The first switching threshold Jsw1 is a point at which to switch the second selection scheme to the first selection scheme.

The second switching threshold Jsw2 is a point at which to switch the first selection scheme to the second selection scheme.

Both the first switching threshold Jsw1 and the second switching threshold Jsw2 are values to be compared with the rotating electrical machine output command Mref. In this example, these values are assumed to be defined by the power-generation torque.

The second switching threshold Jsw2 is set equal to or smaller than the rotating electrical machine output command Mref that corresponds to a smaller one of the maximum output Mmaxinv obtained in the inverter power generation mode and the maximum output Mmaxalt obtained in the alternator power generation mode.

As described above, the rotating electrical machine output command Mref is defined by the power-generation torque command.

The first switching threshold Jsw1, the second switching threshold Jsw2, and the maximum outputs (Mmaxinv, Mmaxalt) are all defined by the power-generation torque.

Further, the maximum output Mmaxalt obtained in the alternator power generation mode is smaller than the maximum output Mmaxinv obtained in the inverter power generation mode, and hence the second switching threshold Jsw2 is set equal to or smaller than the maximum output Mmaxalt obtained in the alternator power generation mode.

In this example, it is assumed that the second switching threshold Jsw2, which is a point at which to switch the first selection scheme to the second selection scheme, is set equal to the maximum output Mmaxalt obtained in the alternator power generation mode as illustrated in FIGS. 8A to 8C.

Note that, as illustrated in FIGS. 8A to 8C, the first switching threshold Jsw1 is set smaller than the second switching threshold Jsw2 defined as described above.

A description is given of how the selection schemes or the power generation modes are switched, under the above-mentioned assumptions, in response to the rotating electrical machine output command Mref that changes with time.

(During Period from Time t0 to Time t1)

As illustrated in FIG. 8A, during a period during which the rotating electrical machine output command Mref is smaller than Mmaxalt (=Jsw2), the first selection scheme is selected as illustrated in FIG. 8B, and the alternator power generation mode is selected as the power generation mode as illustrated in FIG. 8C. Until the rotating electrical machine output command Mref reaches Mmaxalt (=Jsw2) at time t1, the above-mentioned state continues.

(At Time t1)

As illustrated in FIG. 8A, when the rotating electrical machine output command Mref reaches Mmaxalt (=Jsw2), the second selection scheme is selected as illustrated in FIG. 8B, and the power generation mode is switched to the inverter power generation mode as illustrated in FIG. 8C.

(At Time t2)

As illustrated in FIG. 8A, even when the rotating electrical machine output command Mref is decreased to be less than Mmaxalt (=Jsw2), the rotating electrical machine output command Mref is equal to or larger than the first switching threshold Jsw1 that is a point at which to switch the second selection scheme to the first selection scheme, and the selection schemes are therefore not switched as illustrated in FIG. 8B, and the power generation modes are not also switched as illustrated in FIG. 8C.

(During Period from Time t2 to Time t3)

As illustrated in FIG. 8A, even when the rotating electrical machine output command Mref repeatedly rises above and falls below Mmaxalt (=Jsw2), the selection schemes are not frequently switched as illustrated in FIG. 8B, and the power generation modes are also not frequently switched as illustrated in FIG. 8C.

(At Time t3)

As illustrated in FIG. 8A, at a time when the rotating electrical machine output command Mref becomes less than the first switching threshold Jsw1, the selection scheme is switched to the first selection scheme as illustrated in FIG. 8B, and the power generation mode is consequently switched to the alternator power generation mode as illustrated in FIG. 8C.

As described above, when the present invention is applied, even when the rotating electrical machine output command Mref fluctuates, the selection schemes are not frequently switched, and the power generation modes are not frequently switched as a result.

However, when a difference between the first switching threshold Jsw1 and the second switching threshold Jsw2 is smaller than a fluctuation range of the rotating electrical machine output command Mref, there is a fear in that the selection schemes are frequently switched, and hence the fluctuation range and cycle of the rotating electrical machine output command Mref are obtained, and a difference between the first switching threshold Jsw1 and the second switching threshold Jsw2 is then set so that switching occurs at a preset allowable frequency.

The fluctuation range and cycle of the rotating electrical machine output command Mref can be obtained by, for example, being measured in advance under practical conditions.

In the description given above, the maximum output Mmaxinv obtained in the inverter power generation mode and the maximum output Mmaxalt obtained in the alternator power generation mode are constant values, but those values are generally changed in accordance with the rotational speed (RSS) of the rotating electrical machine 2 and the DC voltage value (Vdc) of the energization device 15, because of characteristics of the rotating electrical machine 2 and the power conversion device 1. In such a case, the maximum output Mmaxinv obtained in the inverter power generation mode and the maximum output Mmaxalt obtained in the alternator power generation mode, which are used for processing with the second selection scheme, are changed in accordance with the rotational speed (RSS) of the rotating electrical machine 2 and the DC voltage value (Vdc) of the energization device 15. Through the changing of the maximum outputs as described above, the power generation modes can be switched as illustrated in FIGS. 8A to 8C even when the rotational speed (RSS) of the rotating electrical machine 2 and the DC voltage value (Vdc) of the energization device 15 are changed.

Further, the second switching threshold Jsw2 is set equal to or smaller than the maximum output Mmaxalt obtained in the alternator power generation mode, and the first switching threshold Jsw1 is set smaller than the second switching threshold Jsw2.

When the maximum output Mmaxalt obtained in the alternator power generation mode is changed in accordance with the rotational speed (RSS) of the rotating electrical machine 2 and the DC voltage value (Vdc) of the energization device 15, the first switching threshold Jsw1 and the second switching threshold Jsw2 are also changed in accordance with the rotational speed (RSS) of the rotating electrical machine 2 and the DC voltage value (Vdc) of the energization device 15. Through the changing of the thresholds as described above, even when the rotational speed (RSS) of the rotating electrical machine 2 and the DC voltage value (Vdc) of the energization device 15 are changed, the power generation modes can be switched as illustrated in FIGS. 8A to 8C.

Note that, in the description above, the maximum output is defined as the power-generation torque (GT2) of the rotating electrical machine 2 but can be defined as the power (GW1) of the power conversion device 1 or the power-generation current (GI1) of the power conversion device 1 based on how the rotating electrical machine output command Mref (MOC) is defined. For example, when the rotating electrical machine output command Mref (MOC) is the power command (GWC), the maximum output can be defined as the power (GW), and when the rotating electrical machine output command Mref (MOC) is the power-generation current command (GIC), the maximum output can be defined as the power-generation current (GI).

Further, regardless of how the rotating electrical machine output command Mref (MOC) is defined, the maximum output can be defined as the power-generation torque (GT2) of the rotating electrical machine 2, the power (GW1) of the power conversion device 1, or the power-generation current (GI1) of the power conversion device 1.

Depending on characteristics of the power conversion device 1 or the rotating electrical machine 2, there is a case in which a maximum value of the power-generation torque (GT2) of the rotating electrical machine 2 is larger in the inverter power generation mode than that in the alternator power generation mode, while a maximum value of the power (GW1) of the power conversion device 1 or the power-generation current (GI1) is larger in the alternator power generation mode than that in the inverter power generation mode.

In this case, a relationship between the maximum output Mmaxinv obtained in the inverter power generation mode and the maximum output Mmaxalt obtained in the alternator power generation mode varies depending on which one of the power-generation torque (GT), the power (GW), and the power-generation current (GI) is set to the maximum output. When the power generation modes are required to be switched in accordance with the maximum value of the power (GW) or the power-generation current (GI), the maximum output is redefined as the power (GW1) of the power conversion device 1 or the power-generation current (GI1) of the power conversion device 1 regardless of how the rotating electrical machine output command Mref (MOC) is defined. Through such redefinition of the maximum output, the required generation can be performed.

Further, when it is required, for the purpose of control, to switch the power generation modes in consideration of all of the power-generation torque (GT2) of the rotating electrical machine 2, the power (GW1) of the power conversion device 1, and the power-generation current (GI1) of the power conversion device 1, the maximum output is defined as a linear combination of the power-generation torque (GT2) of the rotating electrical machine 2, the maximum value of the power (GW1) of the power conversion device 1, and the maximum value of the power-generation current (GI1) of the power conversion device 1, regardless of how the rotating electrical machine output command Mref (MOC) is defined. Through such definition of the maximum output, the power generation modes can be switched based on the second selection scheme in consideration of all of the maximum value of the power-generation torque (GT2) of the rotating electrical machine 2, the maximum value of the power (GW1) of the power conversion device 1, and the maximum value of the power-generation current (GI1) of the power conversion device 1.

The maximum value of the power-generation torque (GT2) of the rotating electrical machine 2, the maximum value of the power (GW1) of the power conversion device 1, and the maximum value of the power-generation current (GI1) of the power conversion device 1 can be each weighed for consideration by setting each of a power-generation torque coefficient (GTCO) that is a coefficient corresponding to the term of the maximum value of the power-generation torque (GT2) of the rotating electrical machine 2, a power coefficient (GWCO) that is a coefficient corresponding to the term of the maximum value of the power (GW1) of the power conversion device 1 the power (GW2) of the rotating electrical machine 2, and a power-generation current coefficient (GICO) that is a coefficient corresponding to the term of a maximum value of the power-generation current (GI1) of the power conversion device 1.

Further, when it is required, for the purpose of control, to change weights that are assigned, for consideration, to the power-generation torque (GT2) of the rotating electrical machine 2, the power (GW1) of the power conversion device 1, and the power-generation current (GI1) of the power conversion device 1 in accordance with the rotational speed (RSS) of the rotating electrical machine 2 or the DC voltage value (Vdc) of the energization device 15, the power-generation torque coefficient (GTCO), the power coefficient (GWCO), and the power-generation current coefficient (GICO) are each changed in accordance with the rotational speed (RSS) of the rotating electrical machine 2 or the DC voltage value (Vdc) of the energization device 15. Through the changing of the coefficients as described above, the required operation can be performed.

As described above, the first switching threshold (Jsw1), and the second switching threshold (Jsw2) are defined based on how the rotating electrical machine output command Mref (MOC) is defined, and the second switching threshold (Jsw2) is set equal to or smaller than the rotating electrical machine output command Mref (MOC) corresponding to a smaller one of the maximum output Mmaxinv obtained in the inverter power generation mode and the maximum output Mmaxalt obtained in the alternator power generation mode.

When the rotating electrical machine output command Mref (MOC) and the maximum output are defined to be identical in terms of physical quantity (specifically, this means that the rotating electrical machine output command Mref (MOC) is the power-generation torque command (GTC) and the maximum output corresponds to the power-generation torque (GT), the rotating electrical machine output command Mref (MOC) is the power command (GWC) and the maximum output corresponds to the power (GW), or the rotating electrical machine output command Mref (MOC) is the power current command (GIC) and the maximum output corresponds to the power-generation current (GI)), the second switching threshold (Jsw2) can be set on an assumption that: second switching threshold (Jsw2) maximum output. On the other hand, when the rotating electrical machine output command Mref (MOC) and the maximum output are defined to be different in terms of physical quantity, it is required to calculate the rotating electrical machine output command Mref (MOC) corresponding to the maximum output and set the second switching threshold (Jsw2) based on the rotating electrical machine output command Mref (MOC) that satisfies a condition that: second switching threshold (Jsw2) maximum output. For example, when the rotating electrical machine output command Mref (MOC) is defined as the power-generation torque command (GTC) and the maximum output is defined as the power (GW), it is required to calculate the power-generation torque (GT) corresponding to the power (GW) and set the second switching threshold (Jsw2) based on the power-generation torque (GT) that satisfies a condition that: second switching threshold (Jsw2) maximum output (power).

Note that, in the description above, the first selection scheme is assumed to select a more efficient power generation mode, but a method of selecting a power generation mode by the first selection scheme is not limited to the above-mentioned one and may be another method by which a power generation mode that produces less torque ripple or noise, for example, is selected.

As described above, the power conversion device according to the first embodiment can reduce a frequency of switching between the selection scheme (first selection scheme) for selecting a power generation mode depending on, for example, efficiency and the selection scheme (second selection scheme) for selecting a power generation mode depending on a maximum output. It is accordingly possible to perform high-output operation while switching power generation modes in a stable manner.

Note that, in the first embodiment, the wound magnetic field is adopted as a field of the rotor (22), but the wound magnetic field and a permanent magnet field may be used in combination. Even when the permanent magnet field is used in combination with the wound magnetic field, the output of the rotating electrical machine 2 can be changed in accordance with a current supplied to the field winding.

Further, in the first embodiment, the armature winding 21 of the rotating electrical machine 2 has star-connected three phases, but the number of phases and the phase connection are not limited thereto.

Further, in the first embodiment, the energization is performed with reference to the rotor position of the rotating electrical machine 2 but can be performed, without reference to the rotor position, by internally generating AC phases.

Further, in the first embodiment, the armature voltage command AVC or the field voltage command FVC are generated through the PI control, but a method of generating the armature voltage command AVC or the field voltage command FVC is not limited thereto. The commands can be generated through P control or I control. Alternatively, the voltage command (VC) can be generated from the current command (IC) through use of, for example, a map, without feeding back a current.

Moreover, in the first embodiment, the three-phase to dq conversion and the dq to three-phase conversion are adopted for control but alternating current can be directly controlled.

Moreover, in this embodiment, the energization signal ENS is generated through the PWM control in the inverter power generation mode, but a method of generating the energization signal ENS in the inverter power generation mode is not limited thereto. For example, the energization signal can be generated through, for example, hysteresis control, by which energization elements are switched on/off so that an error of an actual current falls within a predetermined range, with respect to the current command (IC).

Note that, control parts configured by components of the power conversion device 1 of FIG. 1 other than the energization device 15 may be configured through use of different control circuits or integrated into one control circuit.

The processing circuit for achieving those functions may be dedicated hardware, or may be a central processing unit (also referred to as "CPU, processing unit, arithmetic unit, microprocessor, microcomputer, processor, or DSP") configured to execute a program stored in a memory.

Figure 9A:
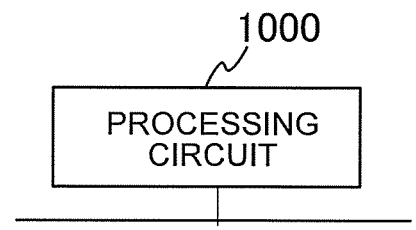
FIGS. 9A and 9B are diagrams for illustrating one example of a hardware configuration of a control part in the power conversion device according to the present invention.
Figure 9B:
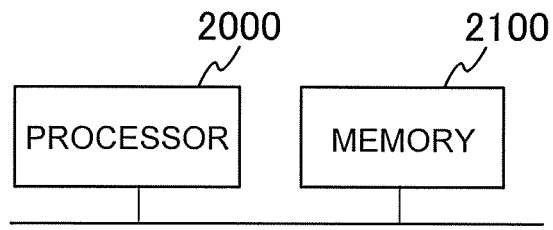

FIGS. 9A and 9B are diagrams for illustrating schematic configurations of the above-mentioned functional parts that are configured by hardware and by software, respectively.

When the functions of the above-mentioned respective components are constructed by hardware illustrated in FIG. 9A, the processing circuit 1000 corresponds to, for example, a single circuit, a composite circuit, a programmed processor, a parallel-programmed processor, ASIC, FPGA, or a combination thereof. The function of each of such components may be implemented by a processing circuit, or the functions of the respective components may be implemented collectively by a processing circuit.

When the functions of the above-mentioned respective components are constructed by a CPU illustrated in FIG. 9B, the functions of the respective components described above are implemented by software, firmware, or a combination of software and firmware. The software and the firmware are written as programs, and stored in a memory 2100. The processing circuit reads and executes the program stored in the memory 2100, to thereby implement the function of each component. It is also understood that those programs cause the computer to execute procedures and methods for the respective components. In this case, the memory 2100 corresponds to, for example, a RAM, a ROM, a flash memory, an EPROM, an EEPROM, or other such non-volatility or volatile semiconductor memory, a magnetic disk, a flexible disk, an optical disc, a compact disc, a MiniDisk, or a DVD.

Some parts of the functions of the respective components described above may be implemented by dedicated hardware, and other parts may be implemented by software or firmware.

As described above, the processing circuit can realize the above-mentioned functions through use of hardware, software, or firmware, or a combination thereof.

Further, various types of information including various maps required for processing are set in advance in a circuit in a case of the hardware configuration or are stored in advance in a memory in a case of the software configuration.

Although one embodiment of the present invention is described above, but the present invention is not limited to the embodiment and it is obvious to a person skilled in the art that various embodiments can be made within the scope of the present invention.

INDUSTRIAL APPLICABILITY

The present invention is applicable to power conversion devices and power converting methods in various fields.

REFERENCE SIGNS LIST 1 power conversion device, 2 rotating electrical machine, 11 rotational speed calculating unit, 12 voltage command generating unit, 13 power-generation switching signal generating unit, 14 energization signal generating unit, 15 energization device, 15a armature winding side energization unit, 15b field winding side energization unit, 15D detecting unit, 21 armature winding, 22 field winding, 121 armature current command generating unit, 122 field current command generating unit, 123 armature voltage command generating unit, 124 field voltage command generating unit, 151 DC power supply, 152 U-phase upper arm, 152a U-phase upper arm energization element, 152b U-phase upper arm free-wheeling diode, 153 U-phase lower arm, 153a U-phase lower arm energization element, 153b U-phase lower arm free-wheeling diode, 154 V-phase upper arm, 154a V-phase upper arm energization element, 154b V-phase upper arm free-wheeling diode, 155 V-phase lower arm, 155a V-phase lower arm energization element, 155b V-phase lower arm free-wheeling diode, 156 W-phase upper arm, 156a W-phase upper arm energization element, 156b W-phase upper arm free-wheeling diode, 157 W-phase lower arm, 157a W-phase lower arm energization element, 157b W-phase lower arm free-wheeling diode, 158a energization element, 158b diode, 159a energization element, 159b diode, 1000 processing circuit, 2000 processor, 2100 memory.

The invention claimed is:

1. A power conversion device, comprising:
an energization device to apply a voltage to an armature winding and a field winding of a rotating electrical machine in accordance with an energization signal, the energization device including, as an operation in a power generation mode:
an inverter power generation mode to cause the rotating electrical machine to perform a power-generation operation by applying a voltage to the armature winding; and
an alternator power generation mode to cause the rotating electrical machine to perform a power-generation operation by generating an induced voltage in the armature winding in such a manner that a voltage is applied to the field winding during rotation of the rotating electrical machine so as to cause a current to flow through the armature winding;
a power-generation switching signal generator to generate a power-generation switching signal for switching the inverter power generation mode and the alternator power generation mode in response to switching of a first selection scheme and a second selection scheme, the first selection scheme being used to select any one of the inverter power generation mode and the alternator power generation mode, and the second selection scheme being used to calculate each of a maximum output obtained in the inverter power generation mode and a maximum output obtained in the alternator power generation mode and select, when a difference between the maximum outputs is equal to or larger than a preset value, one of the inverter power generation mode and the alternator power generation mode, which produces a larger maximum output;
a voltage command generator to generate an armature voltage command that indicates a voltage to be applied to the armature winding and a field voltage command that indicates a voltage to be applied to the field winding, based on a rotating electrical machine output command that indicates an output of the rotating electrical machine; and
an energization signal generator to generate the energization signal corresponding to each of the armature winding and the field winding, based on the armature voltage command, the field voltage command, the power-generation switching signal, and a DC voltage value of the energization device,
wherein the power-generation switching signal generator, when the rotating electrical machine output command is equal to or smaller than a first switching threshold, selects the first selection scheme and generates the power-generation switching signal, and, when the rotating electrical machine output command is equal to or larger than a second switching threshold that is larger than the first switching threshold, selects the second selection scheme and generates the power-generation switching signal.

2. The power conversion device according to claim 1, wherein a difference between the first switching threshold and the second switching threshold is set based on fluctuation range and fluctuation cycle of the rotating electrical machine output command.

3. The power conversion device according to claim 1, wherein the second switching threshold is set equal to or smaller than the rotating electrical machine output command corresponding to a smaller one of the maximum output obtained in the inverter power generation mode and the maximum output obtained in the alternator power generation mode.

4. The power conversion device according to claim 1, wherein the rotating electrical machine output command corresponds to one of a power-generation torque command that indicates a power-generation torque of the rotating electrical machine, a power command that indicates a power to be generated in the power conversion device, the power corresponding to the output of the rotating electrical machine, and a power-generation current command that indicates a power-generation current of the power conversion device, the power-generation current corresponding to the output of the rotating electrical machine.

5. The power conversion device according to claim 1, wherein the voltage command generator generates an armature current command that indicates a current to be supplied to the armature winding based on the rotating electrical machine output command and generates the armature voltage command based on the armature current command.

6. The power conversion device according to claim 5, wherein the voltage command generator generates the armature voltage command based on the armature current command and an armature current of the armature winding.

7. The power conversion device according to claim 1, wherein the voltage command generator generates an field current command that indicates current to be supplied to the field winding based on the rotating electrical machine output command and generates the field voltage command based on the field current command.

8. The power conversion device according to claim 7, wherein the voltage command generating generator generates the field voltage command based on the field current command and an field current of the field winding.

9. The power conversion device according claim 1, wherein the maximum output includes at least one of a maximum value of the power-generation torque of the rotating electrical machine, a maximum value of the power to be generated in the power conversion device, and a maximum value of the power-generation current of the power conversion device.

10. The power conversion device according to claim 9, wherein the maximum output is a linear combination of the maximum value of the power-generation torque of the rotating electrical machine, the maximum value of the power to be generated in the power conversion device, and the maximum value of the power-generation current of the power conversion device, and
wherein a power-generation torque coefficient that is a coefficient of term corresponding to the maximum value of the power-generation torque of the rotating electrical machine, a power coefficient that is a coefficient of term corresponding to the maximum value of the power to be generated in the power conversion device, and a power-generation current coefficient that is a coefficient of term corresponding to the maximum value of the power-generation current of the power conversion device are each set freely.

11. The power conversion device according to claim 1, wherein at least one of the maximum output, the first switching threshold, and the second switching threshold is calculated based on a DC voltage value of the energization device.

12. The power conversion device according to claim 1,
wherein the power-generation switching signal generator calculates efficiency in the inverter power generation mode and efficiency in the alternator power generation mode based on the rotating electrical machine output command, and
wherein the first selection scheme is to select one of the inverter power generation mode and the alternator power generation mode based on the efficiency in the inverter power generation mode and the efficiency in the alternator power generation mode.

13. The power conversion device according to claim 12, wherein, when a difference between the efficiency in the inverter power generation mode and the efficiency in the alternator power generation mode is equal to or larger than a preset value, the first selection scheme is to select the power generation mode the efficiency of which is higher than the other power generation mode.

14. The power conversion device according to claim 12, wherein at least one of the efficiency in the inverter power generation mode and the efficiency in the alternator power generation mode is calculated based on a DC voltage value of the energization device.

15. The power conversion device according to claim 12, further comprising a rotational speed calculator to calculate a rotational speed of the rotating electrical machine,
wherein at least one of the efficiency in the inverter power generation mode and the efficiency in the alternator power generation mode is calculated based on the rotational speed of the rotating electrical machine.

16. The power conversion device according to claim 15, wherein at least one of the maximum output, the first switching threshold, and the second switching threshold is calculated based on the rotational speed of the rotating electrical machine.

17. The power conversion device according to claim 1, further comprising a rotational speed calculator to calculate a rotational speed of the rotating electrical machine,
wherein at least one of the maximum output, the first switching threshold, and the second switching threshold is calculated based on the rotational speed of the rotating electrical machine.

18. The power conversion device according to claim 1, wherein, in the alternator power generation mode, synchronous-rectification power generation control is performed.

19. A power conversion device, comprising:
an energization device to apply a voltage to an armature winding and a field winding of a rotating electrical machine in accordance with an energization signal so as to cause the rotating electrical machine to perform a power-generation operation in an inverter power generation mode in which a voltage is applied to the armature winding and an alternator power generation mode in which a voltage is applied to the field winding during rotation of the rotating electrical machine;
an energization signal generator to generate the energization signal in accordance with a power-generation switching signal for switching the inverter power generation mode and the alternator power generation mode in accordance with: an armature voltage command and a field voltage command that are obtained based on a rotating electrical machine output command that indicates an output of the rotating electrical machine; and
switching between a first selection scheme and a second selection scheme, the first selection scheme being used to select any one of the power generation modes and the second selection scheme being used to, when a difference between maximum outputs of the power generation modes is equal to or larger than a preset value, select one of the power generation modes, the maximum output of which is larger than the other power generation mode; and a power-generation switching signal generator to, when the rotating electrical machine output command is equal to or smaller than a first switching threshold, select the first selection scheme and, when the rotating electrical machine output command is equal to or larger than a second switching threshold that is larger than the first switching threshold, select the second selection scheme, to generate the power-generation switching signal.

20. A power conversion method, comprising:

applying a voltage to an armature winding and a field winding of a rotating electrical machine in accordance with an energization signal so as to cause the rotating electrical machine to perform a power-generation operation in an inverter power generation mode in which a voltage is applied to the armature winding and an alternator power generation mode in which a voltage is applied to the field winding during rotation of the rotating electrical machine;

generating the energization signal in accordance with a power-generation switching signal for switching the inverter power generation mode and the alternator power generation mode in accordance with: an armature voltage command and a field voltage command that are obtained based on a rotating electrical machine output command that indicates an output of the rotating electrical machine; and switching between a first selection scheme and a second selection scheme, the first selection scheme being used to select any one of the power generation modes and the second selection scheme being used to, when a difference between maximum outputs of the power generation modes is equal to or larger than a preset value, select one of the power generation modes, the maximum output of which is larger than the other power generation mode; and generating the power-generation switching signal by selecting, when the rotating electrical machine output command is equal to or smaller than a first switching threshold, the first selection scheme and selecting, when the rotating electrical machine output command is equal to or larger than a second switching threshold that is larger than the first switching threshold, the second selection scheme.

* * * * *